(12) United States Patent
Vasudevan et al.

(10) Patent No.: US 7,759,621 B1
(45) Date of Patent: Jul. 20, 2010

(54) METHOD AND SYSTEM OF PERFORMING MULTIPLE OBSERVATIONS USING A SPACE-BASED TELESCOPE COMPRISING INDEPENDENTLY TARGETABLE SENSOR UNITS

(75) Inventors: Gopal Vasudevan, San Jose, CA (US); John S. Camp, San Francisco, CA (US); Edward A. Lemaster, Cupertino, CA (US); Michael A. Gonzales, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 11/927,103

(22) Filed: Oct. 29, 2007

Related U.S. Application Data

(60) Provisional application No. 60/855,113, filed on Oct. 30, 2006.

(51) Int. Cl.
*G01C 21/02* (2006.01)
*G01C 21/24* (2006.01)
*G01J 1/20* (2006.01)

(52) U.S. Cl. ............. 250/203.6; 250/203.1; 250/206.1; 356/139.01

(58) Field of Classification Search ............. 250/203.3, 250/203.1, 203.4, 203.6, 206.1, 206.2; 356/139.01, 356/139.04; 126/572, 573; 701/13, 226, 701/300–302
See application file for complete search history.

(56) References Cited

U.S. PATENT DOCUMENTS

| | | | | |
|---|---|---|---|---|
| 5,093,563 A | * | 3/1992 | Small et al. | 250/201.9 |
| 6,555,803 B1 | * | 4/2003 | Bremer | 250/203.1 |
| 2004/0094691 A1 | * | 5/2004 | Redler et al. | 250/203.3 |
| 2006/0209400 A1 | * | 9/2006 | Wertz et al. | 359/399 |
| 2006/0249010 A1 | * | 11/2006 | John et al. | 89/1.11 |

* cited by examiner

*Primary Examiner*—Georgia Y Epps
*Assistant Examiner*—Francis M Legasse, Jr.
(74) *Attorney, Agent, or Firm*—McDermott Will & Emery LLP (57) ABSTRACT

Multiple observations using a reconfigurable space-based telescope are performed by independently targeting one or more sensor units, within a field of view, relative to a main body of the space-based telescope. The sensor units are capable of simultaneously obtaining an image of one or more targets, respectively. At least one of the sensor units is independently retargetable relative to the main body of the space-based telescope to obtain an image of at least one other target. Further, the sensor units are independently maneuverable in formation relative to the main body of the space-based telescope to obtain various lines of sight without changing an optical axis of the main body of the space-based telescope.

19 Claims, 6 Drawing Sheets

METHOD AND SYSTEM OF PERFORMING MULTIPLE OBSERVATIONS USING A SPACE-BASED TELESCOPE COMPRISING INDEPENDENTLY TARGETABLE SENSOR UNITS

CLAIM OF PRIORITY UNDER 35 U.S.C. §119

This application claims the benefit of priority under 35 U.S.C. §119 from U.S. Provisional Application Ser. No. 60/855,113, entitled "WIDE FIELD OF VIEW TELESCOPES WITH MULTIPLE INDEPENDENTLY TARGETABLE INSTRUMENTS," filed Oct. 30, 2006, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The subject technology generally relates to telescopes and sensors. More specifically, the subject technology relates to a method and system of performing multiple observations using a space-based telescope.

BACKGROUND

Space-based telescope design has been characterized by a monolithic superstructure aligning and supporting all of the optical elements and sensors of the telescope. For space telescope, a monolithic telescope design generally includes a single structure connecting a body frame of the telescope with a sensor suite at the back end of the body frame for obtaining images. The sensors at the back end of such telescope are fixed for the life of the telescope, and all sensors within the sensor suite have fixed lines of sight relative to each other and to the body frame of the telescope. As a result, each sensor is only capable of making observations within its respective, single fixed line of sight relative to the body frame of the telescope. This monolithic approach makes it impossible to rapidly maneuver from one instantaneous line of sight to another, as each line of sight change requires either maneuvering an entire telescope structure or using a steering mirror. Either approach changes the line of sight for other co-existing instruments. Even a more complicated system of using multiple steering mirrors would not allow different instruments to swap their respective fields of view without additional maneuvers or add-on optics. Such telescopes have little or no sensor flexibility, as sensors can only be added or exchanged through expensive and invasive operations to disassemble the telescope, or by replacing the telescope in its entirety.

SUMMARY

In one aspect of the disclosure, the subject technology is directed to a reconfigurable telescope design in which one or more independently maneuverable sensor units are each targetable and moveable with respect to the main body of the telescope. Under this approach, the telescope line of sight can be changed by repositioning the sensor units, rather than altering the optical axis of the main body of the telescope. Further, by placing a plurality of sensor units within a telescope field of view, multiple simultaneous observations may be obtained. Such an architecture allows simple addition, replacement and/or removal of sensor units during the life of the telescope, as new sensor technologies are developed. For example, in the case of a space telescope, removal of a sensor may only require moving the sensor unit to a parking orbit or de-orbiting the sensor unit altogether. To add new sensors, only the new sensor unit needs to be launched for rendezvous with the main body of the telescope, instead of replacing the entire telescope by a more costly launch.

In another aspect of the disclosure, a method is provided for performing multiple observations using a space-based telescope. The method comprises independently targeting one or more sensor units, within a field of view, relative to a main body of the space-based telescope; and simultaneously obtaining an image of one or more targets by one or more sensor units, respectively.

In a further aspect of the disclosure, a system is provided for performing multiple observations using a space-based telescope. The system comprises one or more sensor units configured to be independently targetable within a field of view, relative to a main body of the space-based telescope, to simultaneously obtain an image of one or more targets, respectively.

In yet a further aspect of the disclosure, a space-based telescope comprises a main body, and one or more sensor units configured to be independently targetable and maneuverable within a field of view, relative to the main body, to simultaneously obtain an image of one or more targets, respectively.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide further understanding of the disclosure and are incorporated in and constitute a part of this specification, illustrate aspects of the disclosure and together with the description serve to explain the principles of the disclosure.

FIGS. 5(*a*) and 5(*b*) are graphical illustrations of various exemplary observation patterns of a sensor unit, according to one aspect of the subject technology.

FIGS. 6(*a*) and 6(*b*) are exemplary graphical illustrations of a sensor unit connected to a bus via a manipulating arm, according to one aspect of the subject technology.

DETAILED DESCRIPTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

Reference will now be made in detail to aspects of the subject technology, examples of which are illustrated in the accompanying drawings, wherein like reference numerals refer to like elements throughout.

Figure 1:
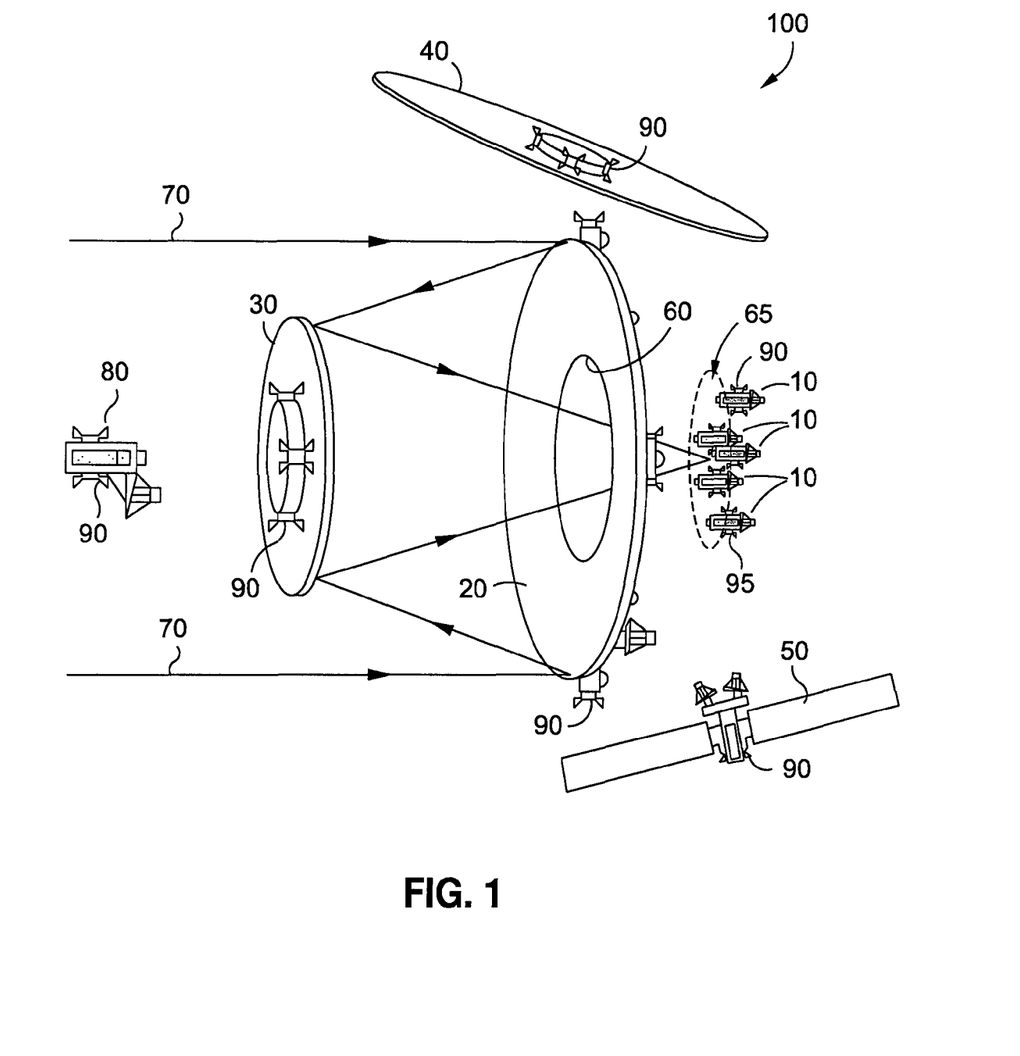
FIG. 1 is a graphical illustration of an exemplary space-based telescope with a plurality of sensor units, according to one aspect of the subject technology.

FIG. 1 is a graphical illustration of an exemplary telescope with a plurality of sensor units, according to one aspect of the subject technology. The configuration as well as the operations described with respect to FIG. 1 are one exemplary illustration. A space-based telescope 100 includes primary mirror 20 with focal surface 60, secondary mirror 30, sunshade 40, power and communications relay 50 and a plurality of sensor units 10. The configuration shown in FIG. 1 depicts a space-based telescope; however, the features and advantages described herein may be realized with a ground telescope as well. Further, while this exemplary configuration shows five sensor units 10, the subject technology is not limited to any particular number of sensor units, and it may utilize any number of sensor units.

Light 70 reflected from the surface of one or more targets (not shown) reflects off primary mirror 20, and then secondary mirror 30, before passing through focal surface 60 of primary mirror 20. Within focal area 65 defined by the area of focal surface 60, sensor units 10 are independently maneuverable and/or independently targetable so that each of sensor units 10 is capable of obtaining images of the target surface from various lines of sight.

By way of illustration, and not by way of limitation, a sensor unit 10 may be considered independently maneuverable if, for example, a sensor unit 10 is configured to be physically movable to another location independently of the other sensor unit(s) and/or independently of the main body of the telescope 100 (e.g., independently of the primary and/or secondary mirrors 20 and 30). One or more of sensor units 10 or all of sensor units 10 may be configured to be independently maneuverable. Further, one or more of sensor units 10 or all of sensor units 10 may be maneuvered in formation relative to the main body of telescope 100.

By way of illustration, and not by way of limitation, a sensor unit 10 can be considered independently targetable if, for example, the sensor unit is configured to allow a line of sight of the sensor unit to be adjustable. An adjustment to a sensor unit 10 can be made independently of the other sensor unit(s) and/or independently of the main body of the telescope 100 (e.g., independently of the primary and/or secondary mirrors 20 and 30). This adjustment may be made, for example, without physically moving the sensor unit to another location (e.g., changing the direction of the sensor unit), or by physically moving the sensor unit to another location. Sensor units 10 can thus have flexible lines of sight, rather than fixed lines of sight, relative to each other and/or to the main body of telescope 100. One or more of sensor units 10 or all of sensor units 10 may be configured to be independently targetable. Further, the line(s) of sight of one or more of sensor units 10 or all of sensor units 10 may be adjusted in formation relative to the main body of telescope 100.

Metrology unit 80 can determine locations of various elements of the telescope, as well as wavefront quality. Moreover, metrology unit 80 can be used to generate collision-free trajectories so that sensor units 10 can move safely within focal area 65. However, it should be noted that processors or devices other than the metrology unit 80 may be employed to perform motion planning of the sensor units 10, to generate trajectories of the sensor units 10 or to control the sensor units 10. According to another exemplary configuration, a metrology unit may be eliminated from a telescope system. This can save fuel and reduce the system complexity.

When each of sensor units 10 (or at least some of them) is independently maneuverable or independently targetable of each other, various images may be obtained simultaneously, without moving the main body of the telescope. The main body of the telescope can be, for example, defined by primary mirror 20 and secondary mirror 30, according to one configuration of the subject technology.

Sensor units 10 may be solar powered. However, use of sunshade 40, which may be employed to shield all telescope components, may preclude the use of deployed solar arrays to power sensor units 10. Therefore, power and communication relay 50 can be employed to relay power to sensor units 10. Further, in one aspect of the disclosure, it may be desirable to reduce the weight of sensor units 10. In this case, sensor units 10 may not be configured with long-distance communication equipment for communications to the ground and to other telescope components. Therefore, such communications may run through the power and communication relay 50. However, the present disclosure is not limited to any particular embodiment, and various communication mechanisms may be employed without departing from the scope of the claimed invention.

Sensor units 10 may be any type of sensor used to obtain an image (e.g., a scanning sensor, a staring sensor, etc.). Images may be obtained by, for example, a continuous panchromatic scan over a region within the telescope field of view, persistent staring over multiple target points, detection and tracking of targets at high-resolution under varying lighting conditions, simultaneous multiple target coverage, tracking a moving target and/or multiple instrument observations (e.g., visible, infrared, or hyper spectral).

Figure 2:
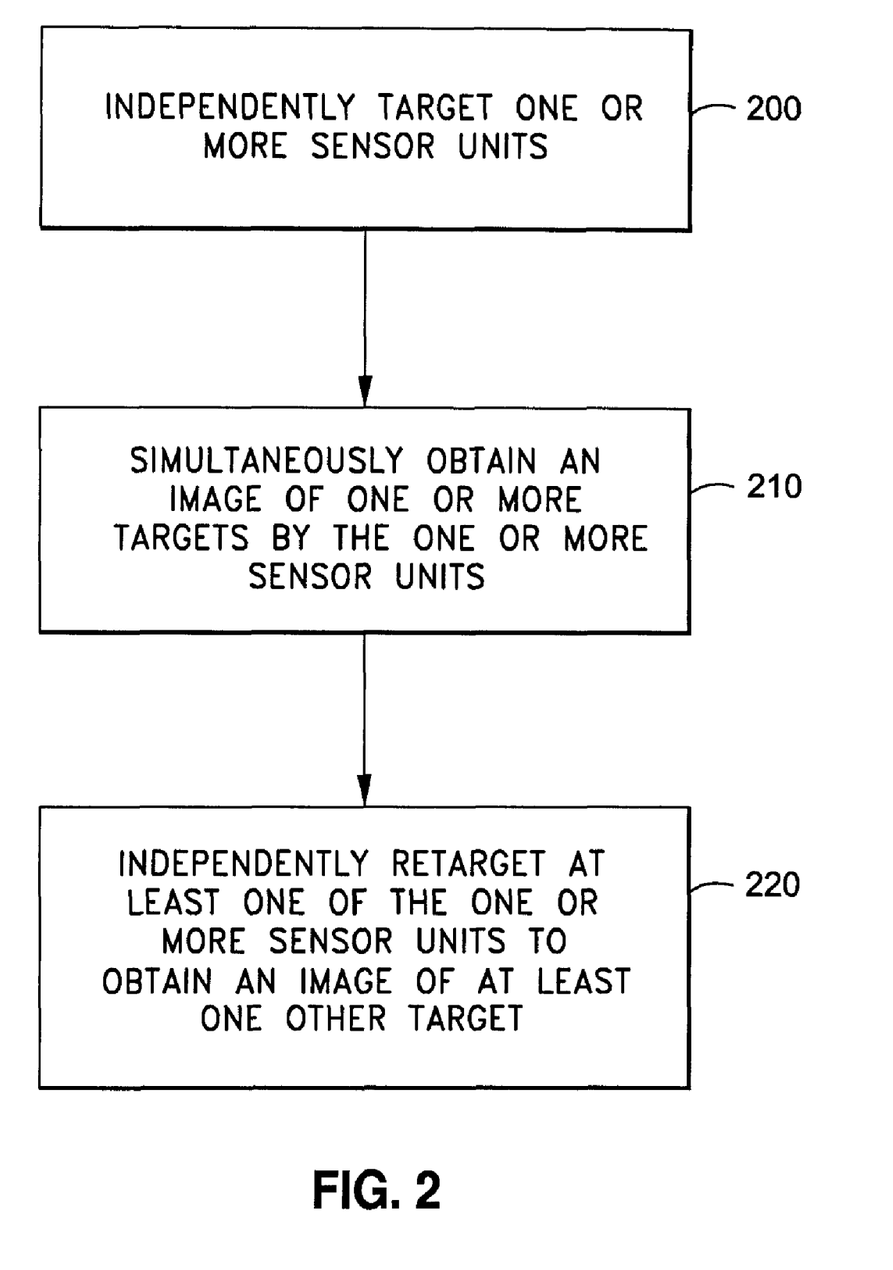
FIG. 2 is a flowchart illustrating an exemplary method of performing multiple observations using a space-based telescope, according to one aspect of the subject technology.

FIG. 2 is a flowchart illustrating an exemplary method of performing multiple observations using a telescope, according to one aspect of the subject technology. At operation 200, one or more sensor units 10 are independently targeted within a field of view of telescope 100. The one or more sensor units 10 are each freely targetable with respect to each other, as well as to the main body (i.e., primary mirror 20 and secondary mirror 30) of telescope 100. Each of sensor units 10 is capable of adjusting its line of sight in order to obtain an image of a target without any movement of any other components of telescope 100 (e.g., without moving primary mirror 20 or secondary mirror 30). The line of sight of a sensor unit 10 may be adjusted by maneuvering the sensor unit 10 to another location within the focal area 65 defined by focal surface 60 (see FIG. 1), and/or by aiming the sensor unit 10 in another direction. To adjust the direction of a sensor unit 10, one may employ any of a number of different line-of-sight adjusting elements or techniques (e.g., thrusters, reaction/momentum wheels, mechanical linkages, arms (discussed below with reference to FIGS. 6(a) and 6(b)), and electromagnetic positioning, any one or more of which may act as an attitude adjuster, a direction adjuster, a rotation adjuster, a lateral or vertical adjuster, or an axial adjuster). The subject technology is not limited to these examples. A line-of-sight adjusting element 95 is shown as a part of a sensor unit 10 in FIG. 1. Each of sensor units 10 may adjust its line of sight in a different way (e.g., moved to a different location or aimed in a different direction), some of them may adjust their lines of sight in the same way or in different ways, or all of them may adjust their lines of sight in the same way.

At operation 210, the one or more sensor units 10 simultaneously obtain a respective image of one or more targets. As noted above, sensor units 10 need not be configured with powerful communication equipment to communicate with a distant viewer (not shown). In such a situation, images may be communicated to the viewer through the power and communication relay 50 (see FIG. 1).

At operation 220, at least one of sensor units 10 is independently retargeted to obtain an image of at least one other target. For instance, the line of sight of at least one of sensor units 10 is changed, independently of the other sensor units 10 and/or the main body of telescope 100. In one aspect of the disclosure, one or more sensor units 10 may be maneuvered in formation relative to the main body of telescope 100.

Figure 3:
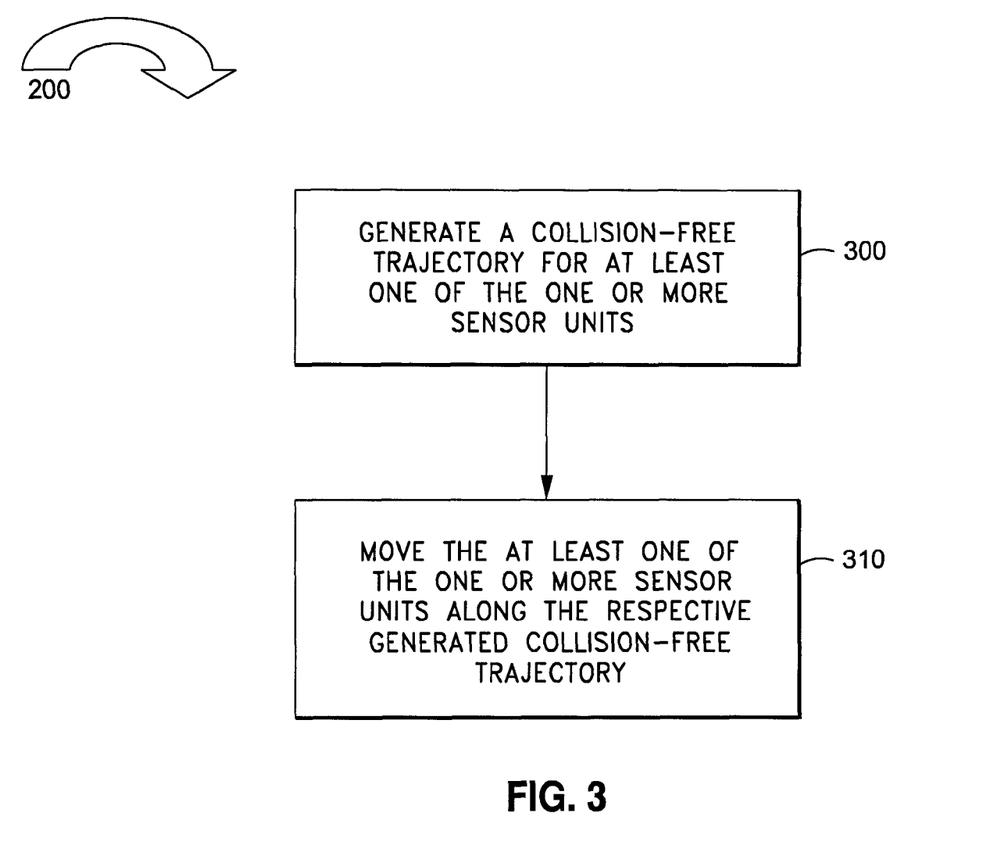
FIG. 3 is a flowchart illustrating an exemplary method of independently targeting one or more sensor units, according to one aspect of the subject technology.

FIG. 3 is a flowchart illustrating an exemplary method of independently targeting one or more sensor units, according to one aspect of the subject technology. Operation 200 of FIG. 2 may include operations 300 and 310 according to one exemplary method. At operation 300, a collision-free trajectory for at least one of sensor units 10 is generated. Metrology unit 80 of FIG. 1 may perform operation 200. Generation of the collision-free trajectory will be discussed further below with reference to FIG. 4. At operation 310, sensor unit 10 is moved along its respective generated collision-free trajectory to obtain an image of a desired target from a predetermined line of sight.

Figure 4:
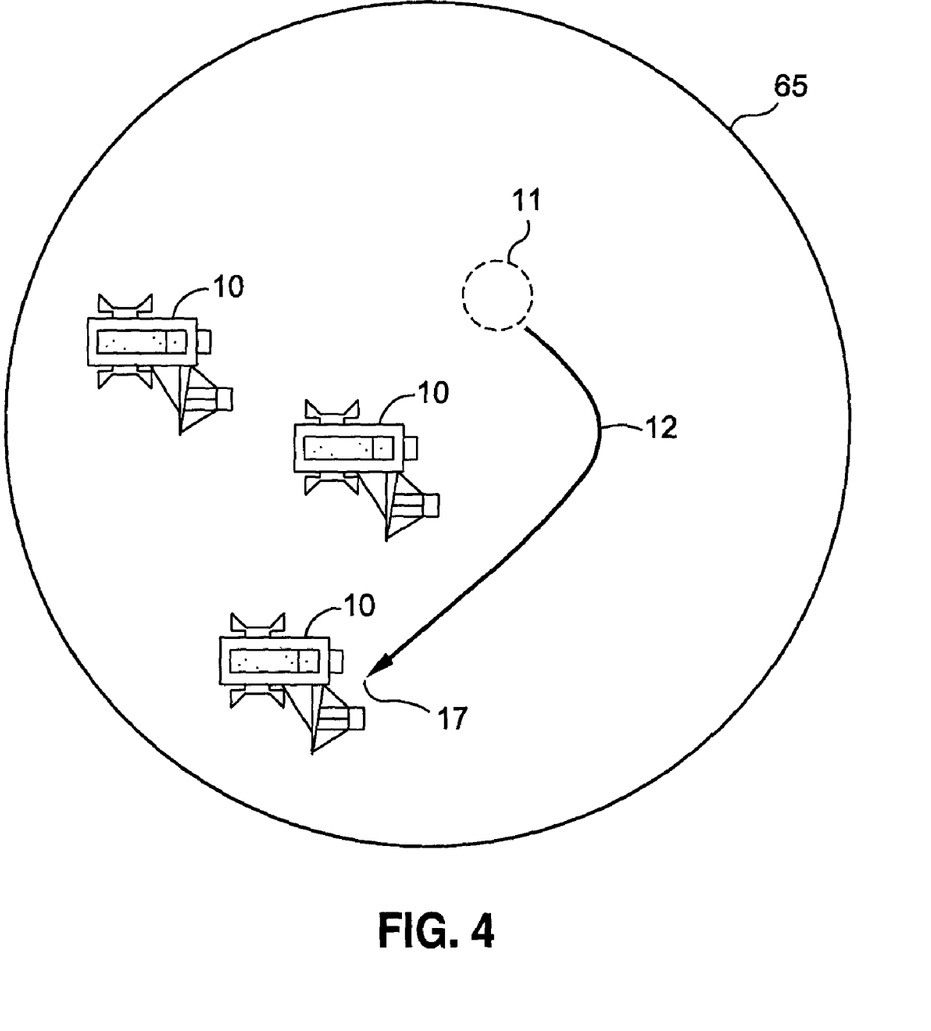
FIG. 4 is a graphical illustration of an exemplary movement of a sensor unit, according to one aspect of the subject technology.

FIG. 4 is a graphical illustration of an exemplary movement of a sensor unit, according to one aspect of the subject technology. One of sensor units 10 is shown to have moved from original location 11 along collision-free trajectory 12, around a second sensor unit 10, to another location 17 within focal area 65. Collision-free trajectory can be generated by a motion planning processor employed by metrology unit 80 (see FIG. 1) or elsewhere in the system. The motion planning processor merges the information regarding the current locations of all sensor units 10 with a desired observation location determined by a supervisor, and is programmed to generate a collision-free trajectory for a particular sensor unit 10 so that it can arrive at the desired observation location. The Randomized Kinodynamic Motion Planning (RKMP) technique may be utilized to generate collision-free trajectories 12, as well as any other conventional motion planning technique.

Figure 5A:
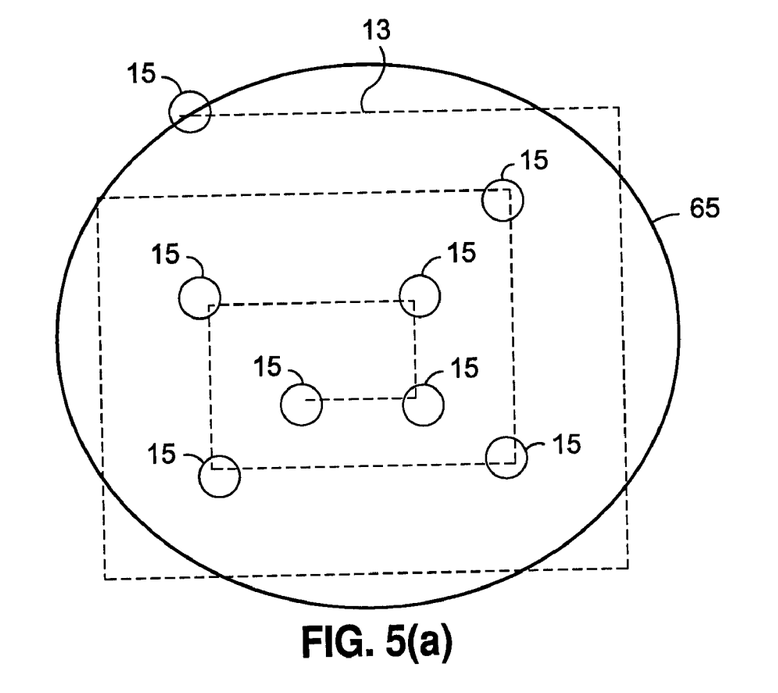
Figure 5B:
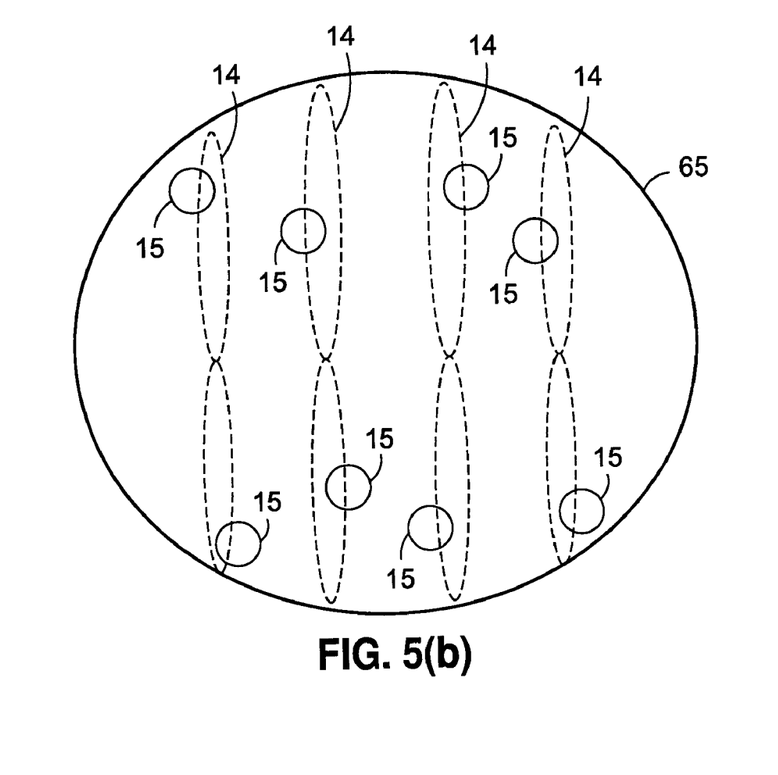

FIGS. 5(a) and 5(b) are graphical illustrations of various exemplary observation patterns of a sensor unit, according to one aspect of the subject technology. Specifically, FIGS. 5(a) and 5(b) show various panchromatic scan missions accomplished by sensor unit 10. Performance metrics and parameters of interest (e.g., response time, fuel usage, system cost, and other available resources) are balanced using, for example, the Generalized Information Network Analysis (GINA) framework for conducting multi-objective optimization architecture analysis. For example, a mission may include scanning a region within a predetermined time or continuously scanning given available resources.

Such missions may be accomplished by, for example, thrusting one or more of sensor units 10 in a rational spiral, thereby covering a given geographical area within the focal area 65 in a minimum amount of time. FIG. 5(a) shows an example of a rational spiral mission, where a sensor unit 10 moves along path 13 to obtain various images at various fields of view 15 within focal area 65.

As another example of a scanning mission, FIG. 5(b) shows an inclined orbit to give a figure-8 pattern within focal area 65, shown by paths 14, which minimizes fuel consumption. Of course, the patterns shown in FIGS. 5(a) and 5(b) are merely examples of possible missions, and a more optimal solution may be obtained through various combinations of patterns.

When using a very large primary mirror 20 (e.g., ~30 m in diameter) in a wide field of view telescope, for geosynchronous orbits for example, a diameter of approximately 2000 km of the Earth's surface, for example, may be mapped on the focal surface 60 (e.g., ~7 m in diameter) of primary mirror 20. It is noted, however, that the subject technology is not limited to these dimensions. To effectively image the Earth's surface at precise resolutions, each sensor unit 10 may be aligned axially to <200 nm (for focus), laterally to <1 mm, and rotationally to <1 μrad. While obtaining an image, lateral stability of sensor units 10 is maintained to <2 μm. These values may vary with system configuration and desired objectives.

Position and attitude sensing may be, for example, controlled by metrology unit 80 and may include a radio frequency (RF) system that will provide course-relative position and attitude to <1 mm and <1 deg. Further, a laser-based optical metrology system that precisely measures the locations of sensor units 10 to <1 μm can be also employed. Final positioning of sensor units 10 relies upon feedback from sensor units 10 themselves. Of course, the subject technology is not limited to any particular positioning mechanism, and one of ordinary skill in the art would realize that alternate mechanisms may be employed without departing from the scope of the claimed invention.

Sensor units 10 as well as other devices of telescope 100 shown in FIG. 1 may need to be configured appropriately so as to maintain proper formation against forces conspiring to pull the formation apart, such as orbital dynamics, solar wind, electrostatics and/or drag. In one aspect of the disclosure, each (or some) of the devices shown in FIG. 1 can have an arm system (such as those discussed below with reference to FIGS. 6(a) and 6(b)) and/or thrusters to control the formation. One exemplary configuration of a telescope may utilize on orbit construction of a superstructure to keep various devices—such as primary mirror 20, secondary mirror 30, and any other devices shown in FIG. 1—in course alignment. A superstructure may be, for example, a single maneuverable superstructure.

Course actuation of sensor units 10 for large or rapid slews may use standard cold-gas thrusters and miniature reaction wheels. Cold gas thrusters may be desirable from a contamination standpoint; however, chemical propulsion may be desirable to maximize agility and lifespan. Intermediate actuation of sensor units 10 at the mN-μN level may use an electric propulsion system such as Pulsed Plasma Thrusters or Field Emission Electric Propulsion. Optical-level control can be provided by optical delay lines and fast steering mirrors. Also, jitter rejection may be provided, for example, by utilization of the LM Disturbance Free Payload (DFP) interface. In addition, other actuation methods, such as Electromagnetic Formation Flying (EMFF), to provide spacecraft actuation without thrusters, may be used without departing from the scope of the claimed invention. Referring back to FIG. 1, each of devices 10, 20, 30, 40, 50, 60 and 80 may include one or more actuators 90. It should be noted that while a device may include one or more actuators 90, only one actuator for a device type is labeled with a reference number 90, so as not to obscure the figure. Each of sensor units 10 may include one or more actuators 90. Each of these devices can be moved using its respective actuator(s) independently of each other. Actuator 90 of a sensor unit 10 may be used to move the sensor unit and/or to adjust its line of sight. Actuator 90 of sensor unit 10 can allow its sensor unit to be independently maneuverable and/or independently targetable. It should be noted that the subject technology is not limited to the exemplary actuator mechanisms described above and may employ other alternate mechanisms. If telescope 100 in FIG. 1 is a ground telescope, one of ordinary skill in the art would realize that other suitable mechanisms may be utilized to move sensor units 10 or to independently adjust lines of sight. An actuator 90 can be implemented using any of the mechanisms described above, and it can function as a line-of-sight adjusting element 95 of FIG. 1 according to one aspect of the subject technology.

Figure 6A:
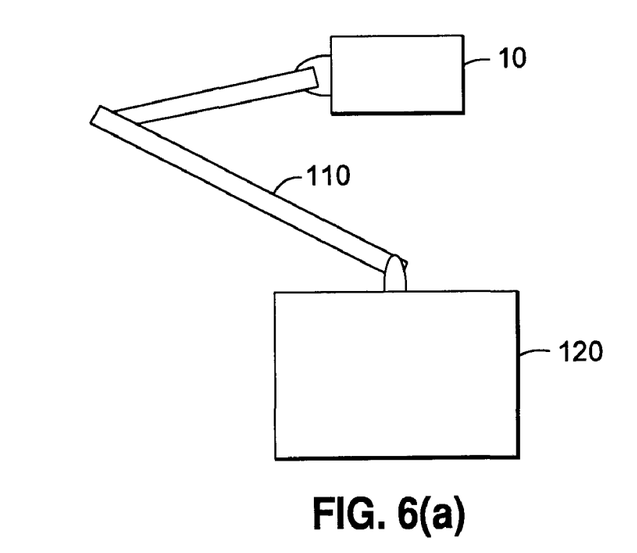
Figure 6B:
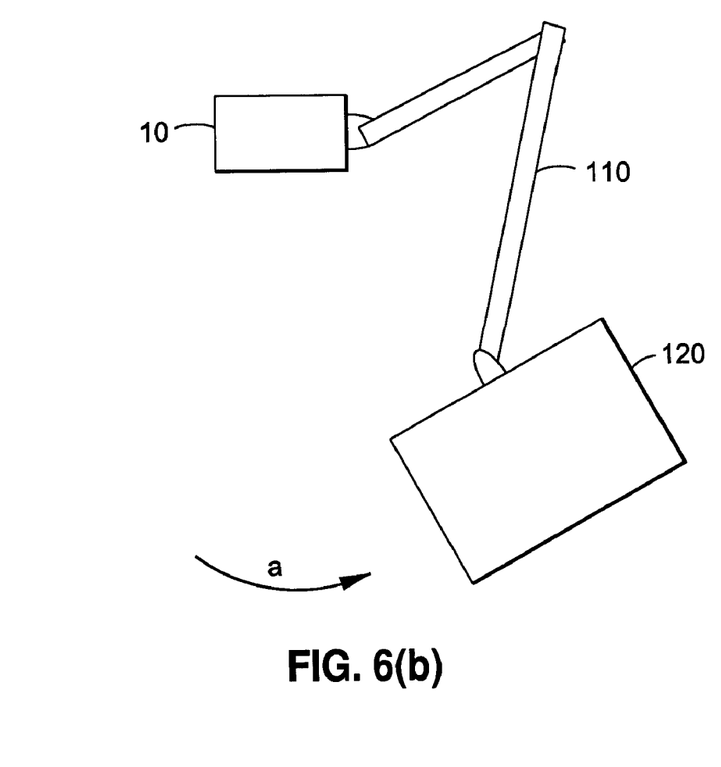

An exemplary method and system providing stability control is shown in FIGS. 6(a) and 6(b) according to one aspect of the subject technology. FIGS. 6(a) and 6(b) are exemplary graphical illustrations of a sensor unit 10 connected to a bus 120 via a manipulating arm 110, according to one aspect of the subject technology. As depicted in FIGS. 6(a) and 6(b), by using motorized manipulating arm 110, sensor unit 10 may be flown (or moved) in precise formation with main body of telescope 100 of FIG. 1 while bus 120, with thrusting capability, is allowed to drift.

As shown in FIG. 6(b), as bus 120 drifts in the direction marked by arrow a, manipulating arm 110 compensates for the drift to maintain the position of sensor unit 10, providing a consistent line of sight for sensor unit 10 without using thrusting capabilities of bus 120. Thrusting bus 120 will only be required when the manipulating arm 110 is no longer capable of maintaining the line of sight of sensor unit 10. Avoiding the use of thrusters provides enhanced stability control by minimizing jitter associated with course and intermediate actuation. Further, fuel costs and pollution associated with constant thrusting are mitigated.

Performing multiple observations using a telescope, with one or more sensor units independently targetable within a field of view, relative to a main body of the telescope, to simultaneously obtain an image of one or more targets, respectively, provides persistent regional surveillance of multiple stationary or moving targets. As an example, such multiple observations can be performed using a telescope in geostationary orbit. Further, rapid access and retargeting of multiple instruments to obtain simultaneous images of other targets is possible, while obviating the need to slew a large telescope. Of course, the present disclosure is not limited to geostationary orbit telescopes, and other systems may be employed to realize these or other objectives, within the scope of the claimed invention.

Remote sensing and surveillance over a region may be achieved through a constellation of satellites with a predefined instrument suite. The drawback of this approach is that it limits the implementation to having either high resolution or persistent coverage, but not both. However, the combination, as disclosed herein, of rapidly-retargetable multiple-object tracking over a regional area, with a wide range of fields of view and instruments, uniquely benefits the intelligence community. For example, timely, high-resolution imagery provides tremendous benefits for military operations, anti-terrorism efforts, weapons of mass destruction (WMDs) non-proliferation monitoring, drug interdiction, and other activities critical to national security.

It is understood that the specific order or hierarchy of steps or operations in the processes disclosed is an illustration of exemplary approaches. Based upon design preferences, it is understood that the specific order or hierarchy of steps or operations in the processes may be rearranged. Some of the steps may be performed simultaneously. The accompanying method claims present elements of the various steps or operations in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing multiple observations using a space-based telescope, comprising:
   independently targeting one or more sensor units, within a field of view, relative to a main body of the space-based telescope, wherein the main body comprises a primary mirror and a secondary mirror; and
   simultaneously obtaining an image of one or more targets by the one or more sensor units, respectively,
   wherein the independently targeting comprises:
      generating a collision-free trajectory for at least one of the one or more sensor units based on a current location of each of the one or more sensor units and a desired observational location; and
      moving the at least one of the one or more sensor units along the respective generated collision-free trajectory.

2. The method of claim 1, further comprising independently retargeting at least one of the one or more sensor units relative to the main body of the space-based telescope to obtain an image of at least one other target.

3. The method of claim 1, wherein the independently targeting further comprises maneuvering the one or more sensor units in formation relative to the main body of the space-based telescope.

4. The method of claim 1, wherein the independently targeting further comprises adjusting a line of sight of the at least one of the one or more sensor units independently of the main body of the space-based telescope, and wherein the adjusting is independent of another one of the one or more sensor units.

5. The method of claim 1, wherein the one or more sensor units comprise two or more sensor units.

6. The method of claim 3, wherein the maneuvering comprises maneuvering one or more busses attached respectively to the one or more sensor units via respective arms, wherein each of the arms is configured to manipulate the respective one or more sensor units relative to the one or more busses.

7. A system for performing multiple observations using a space-based telescope, comprising:
   one or more sensor units configured to be independently targetable within a field of view, relative to a main body of the space-based telescope, to simultaneously obtain an image of one or more targets, respectively, wherein the main body comprises a primary mirror and a secondary mirror; and
   a motion planner configured to generate a collision-free trajectory for at least one of the one or more sensor units based on a current location of each of the one or more sensor units and a desired observational location, and to cause the at least one of the one or more sensor units to move along the respective generated collision-free trajectory.

8. The system of claim 7, wherein at least one of the one or more sensor units is configured to be independently retargetable relative to the main body of the space-based telescope to obtain an image of at least one other target.

9. The system of claim 7, wherein the one or more sensor units are configured to maneuver in formation relative to the main body of the space-based telescope.

10. The system of claim 7, further comprising one or more maneuverable busses, attached respectively to the one or more sensor units via respective arms, wherein each of the arms is configured to manipulate the respective one or more sensor units relative to the one or more maneuverable busses.

11. The system of claim 7, wherein the one or more sensor units comprise two or more sensor units.

12. The system of claim 7, wherein each of the one or more sensor units comprises an actuator.

13. The system of claim 7, wherein the at least one of the one or more sensor units comprises a line-of-sight adjusting element, and the line-of-sight adjusting element is configured to adjust a line of sight of the at least one of the one or more sensor units independently of the main body of the space-based telescope.

14. The system of claim 13, wherein the line-of-sight adjusting element is further configured to adjust the line of sight of the at least one of the one or more sensor units independently of another one of the one or more sensor units.

15. A space-based telescope comprising:
a main body, wherein the main body comprises a primary mirror and a secondary mirror;
one or more sensor units configured to be independently targetable and maneuverable within a field of view, relative to the main body, to simultaneously obtain an image of one or more targets, respectively; and
a motion planner configured to generate a collision-free trajectory for at least one of the one or more sensor units based on a current location of each of the one or more sensor units and a desired observational location, and to cause the at least one of the one or more sensor units to move along the respective generated collision-free trajectory.

16. The space-based telescope of claim 15, wherein each of the one or more sensor units comprises an actuator.

17. The space-based telescope of claim 15, further comprising a power and communications relay.

18. The space-based telescope of claim 15, wherein the space-based telescope is configured to maneuver in space, and the space-based telescope comprises one or more spacecraft actuators.

19. The space-based telescope of claim 15, wherein the at least one of the one or more sensor units comprises a line-of-sight adjusting element, and the line-of-sight adjusting element is configured to adjust a line of sight of the at least one of the one or more sensor units independently of the main body of the space-based telescope.

* * * * *